US007158968B2

(12) United States Patent
Cardno (10) Patent No.: US 7,158,968 B2
(45) Date of Patent: Jan. 2, 2007

(54) DATABASE QUERY SYSTEM AND METHOD

(75) Inventor: Andrew John Cardno, Wellington (NZ)

(73) Assignee: Compudigm International Limited, Wellington (NZ)

( * ) Notice: Subject to any disclaimer, the term of this patent is extended or adjusted under 35 U.S.C. 154(b) by 396 days.

(21) Appl. No.: 10/395,020

(22) Filed: Mar. 21, 2003

(65) Prior Publication Data

US 2004/0024770 A1   Feb. 5, 2004

Related U.S. Application Data

(63) Continuation of application No. PCT/NZ01/00197, filed on Sep. 24, 2001.

(30) Foreign Application Priority Data

Sep. 22, 2000 (NZ) ..................... 507121

(51) Int. Cl.
*G06F 17/30* (2006.01)
(52) U.S. Cl. ................ 707/4; 345/440; 345/530
(58) Field of Classification Search ............... 707/1–5, 707/104.1, 51; 345/440, 443, 530, 531
See application file for complete search history.

(56) References Cited

U.S. PATENT DOCUMENTS

| | | | | |
|---|---|---|---|---|
| 5,404,506 A | * | 4/1995 | Fujisawa et al. ............ | 707/4 |
| 5,428,737 A | * | 6/1995 | Li et al. ..................... | 707/4 |
| 5,487,141 A | * | 1/1996 | Cain et al. .................. | 715/764 |
| 5,515,488 A | * | 5/1996 | Hoppe et al. ............... | 345/440 |
| 5,966,139 A | | 10/1999 | Anupam et al. ............ | 345/440 |

FOREIGN PATENT DOCUMENTS

| WO | WO 00/77682 | 12/2000 |
|---|---|---|
| WO | WO 00/79438 | 12/2000 |

OTHER PUBLICATIONS

Michael J. Zyda, "A Decomposable Algorithm for Contour Surface Display Generation", ACM Transactions on Graphics, vol. 7, No. 2, Apr. 1988, pp. 129-148.*
Michael L. Rhodes, "An Algorithmic Approach To Controlling Search In Three-Dimensional Image Data", ACM, 1979, pp. 134-142.*
Jock Mackinlay, "Automating the Design of Graphical Presentations of Relational Information", ACM Transactions on Graphics, vol. 5, No. 2, Apr. 1986, pp. 110-141.*

* cited by examiner

*Primary Examiner*—Greta Robinson
*Assistant Examiner*—Cheryl Lewis
(74) *Attorney, Agent, or Firm*—Dorsey & Whitney LLP (57) ABSTRACT

The invention provides a data visualization system comprising a data value memory in which is maintained a finite set of data values; a retrieval component configured to retrieve a set of data values from the data value memory; a display component configured to display a representation of each of the set of the retrieved data values centered on respective data points; and a contour generator configured to generate and display a contoured representation around each data point, such that each data point is displayed as a local maximum. The invention further provides a data visualization system in which a display component is configured to display a graphical representation of a set of retrieved data values based at least partly on display parameters included in a database query expression. The invention also provides related methods and computer programs.

24 Claims, 5 Drawing Sheets

DATABASE QUERY SYSTEM AND METHOD

CROSS-REFERENCE TO RELATED APPLICATIONS

This application is a Continuation of International Patent Application PCT/NZ01/00197, filed on Sep. 24, 2001, which was published in English, which claims priority to New Zealand Patent Application 507121, filed on Sep. 22, 2000, the contents of which are incorporated in their entirety by reference.

FIELD OF INVENTION

The invention relates to a database query system and method.

BACKGROUND TO INVENTION

The low cost of data storage hardware has led to the collection of large volumes of data. Merchants, for example, generate and collect large volumes of data during the course of their business. To compete effectively, it is necessary for a merchant to be able to identify and use information hidden in the collected data. This data could include shop floor sales, and where the merchant operates a website, the use that is made of a website may also be collected. The task of identifying this hidden information has proved very difficult for merchants.

Traditionally, analysis of data has been achieved by running a query on a set of data records stored in a database. The merchant or other party first creates a hypothesis, converts this hypothesis to a query, runs the query on the database, and interprets the results obtained with respect to the original hypothesis. One disadvantage of this verification-driven hypothesis approach is that the merchant must form the desired hypothesis in advance.

Our patent specification WO 00/77682 to Compudigm International Limited entitled "Data visualization system and method" describes a system and method for presenting data in an easily interpreted and intuitive manner by displaying a contoured representation of data superimposed on a graphical spatial representation of the premises of a merchant or other party.

It would be particularly advantageous to provide a system which enables a user greater flexibility in selecting and customizing contoured representations to be displayed.

SUMMARY OF INVENTION

In broad terms in one form the invention comprises a data visualization system comprising a data value memory in which is maintained a finite set of data values; a retrieval component configured to retrieve a set of data values from the data value memory; a display component configured to display a representation of each of the set of the retrieved data values centered on respective data points; and a contour generator configured to generate and display a contoured representation around each data point, such that each data point is displayed as a local maximum.

In broad terms in another form the invention comprises a data visualization system comprising a data value memory in which is maintained a finite set of data values; a retrieval component configured to receive a database query expression and to retrieve a set of data values from the data value memory using the database query expression; a display component configured to display a graphical representation of each of the set of the retrieved data values centered on respective data points based at least partly on display parameters included in the database query expression; and a contour generator configured to generate and display a contoured representation around each data point, such that each data point is displayed as a local maximum.

In broad terms in yet another form the invention comprises a method of data visualization comprising the steps of maintaining in a data value memory a finite set of data values; retrieving from the data value memory a set of data values; displaying a representation of each of the set of retrieved data values centered on respective data points; and generating and displaying a contoured representation around each data point, such that each data point is displayed as a local maximum.

In broad terms in another form the invention comprises a method of data visualization comprising the steps of maintaining in a data value memory a finite set of data values; receiving a database query expression; retrieving a set of data values from a data value memory using the database query expression; displaying a graphical representation of each of the set of the retrieved data values centered on respective data points based at least partly on display parameters included in the database query expression; and generating and displaying a contoured representation around each data point, such that each data point is displayed as a local maximum.

In broad terms in yet another form the invention comprises a data visualization computer program comprising a finite set of data values maintained in a data value memory; a retrieval component configured to retrieve a set of data values from the data value memory; a display component configured to display a representation of each of the set of the retrieved data values centered on respective data points; and a contour generator configured to generate and display a contoured representation around each data point, such that each data point is displayed as a local maximum.

In broad terms in another form the invention comprises a data visualization computer program comprising a finite set of data values maintained in a data value memory; a retrieval component configured to receive a database query expression and to retrieve a set of data values from the data value memory using the database query expression; a display component configured to display a graphical representation of each of the set of the retrieved data values centered on respective data points based at least partly on display parameters included in the database query expression; and a contour generator configured to generate and display a contoured representation around each data point, such that each data point is displayed as a local maximum.

BRIEF DESCRIPTION OF THE FIGURES

Preferred forms of the database query system and method will now be described with reference to the accompanying figures in which.

DETAILED DESCRIPTION OF PREFERRED FORMS

Figure 1:
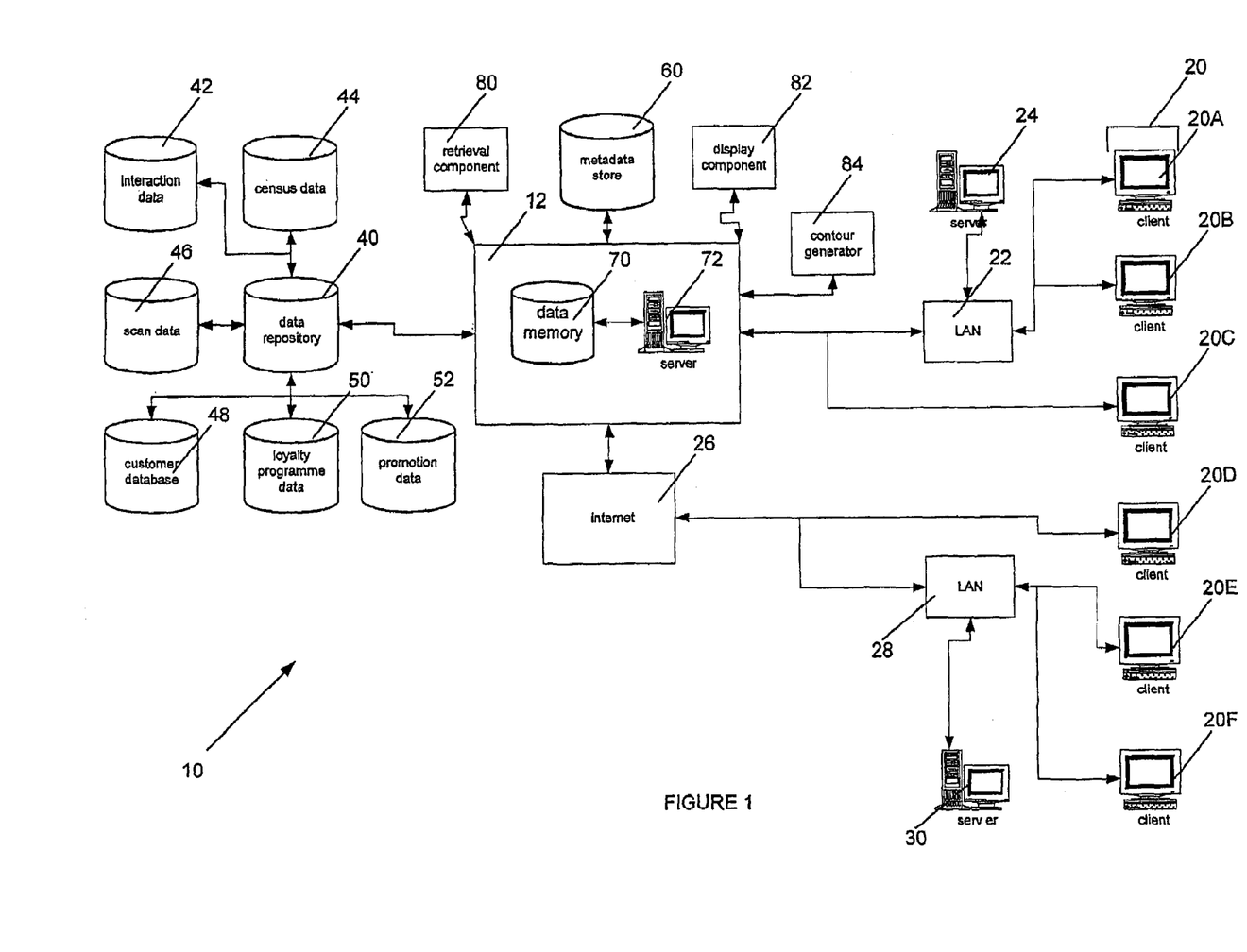
FIG. 1 shows a block diagram of a system in which one form of the invention may be implemented.

FIG. 1 illustrates a block diagram of the preferred system 10 in which one form of the present invention may be implemented. The system includes one or more clients 20 for example 20A, 20B, 20C, 20D, 20E and 20F, which each may comprise a personal computer, workstation or other computing device described below. Each client 20 is interfaced to a workstation 12 as shown in FIG. 1. Each client 20 could be connected directly to the workstation 12, could be connected through a local area network or LAN, or could be connected through the Internet.

Clients 20A and 20B, for example, are connected to a network 22, such as a local area network or LAN. The network 22 could be connected to a suitable network server 24 and communicate with the workstation 12 as shown. Client 20C is shown connected directly to the workstation 12. It is envisaged that client 20C could connect to the workstation 12 through any suitable connection apparatus, either wired or wireless. Clients 20D, 20E and 20F are shown connected to the invention 12 through the Internet 26. Client 20D is shown as connected to the Internet 26 with a dial-up connection and clients 20E and 20F are shown connected through a network 28 such as a local area network or LAN, with the network 28 connected to a suitable network server 30.

The preferred system 10 further comprises a data repository 40, for example a data warehouse maintained in the memory. It is envisaged that the data repository may alternatively comprise a single database, a collection of databases, or a data mart. The preferred data repository 40 includes data from a variety of sources. The data repository may include, for example, interaction data 42 representing interactions between customers and merchants as will be more particularly described below. The data repository may also include data from other sources, for example census data 44, scan data 46 obtained from scanning bar-codes on products, data from merchant customer databases 48, data from merchant loyalty programmes 50 and/or promotion data 52 held by a merchant or other organization.

The system preferably further comprises a metadata store 60 in which a series of metadata layers are stored and retrieved by the invention 12. It is envisaged that the metadata store may comprise a data warehouse, a single database, a collection of databases or a data mart. The metadata store 60 is further described below.

One preferred form of the invention comprises a personal computer or workstation operating under the control of appropriate operating and application software having a data memory 70 interfaced to a processor 72. The invention is arranged to receive a query, for example from a client 20, to retrieve data from the data repository 40 and the metadata store 60 using the query, to process the data with the server 72 and to display the data on a client workstation 20, as will be described below.

The system 10 further comprises a retrieval component 80 which in one form is a computer implemented software program which is configured to receive the query from the client 20 and to retrieve the data from the data repository 40 using the database query. The system 10 further comprises a display component 82 which in one form is a software implemented component which is configured to display a representation of each of the set of data values retrieved by the retrieval component 80 on a client 20. A contour generator 84 implemented as a software program is configured to generate and display a contoured representation around each data point on the representation displayed by the display component 80 on client 20.

Figure 2:
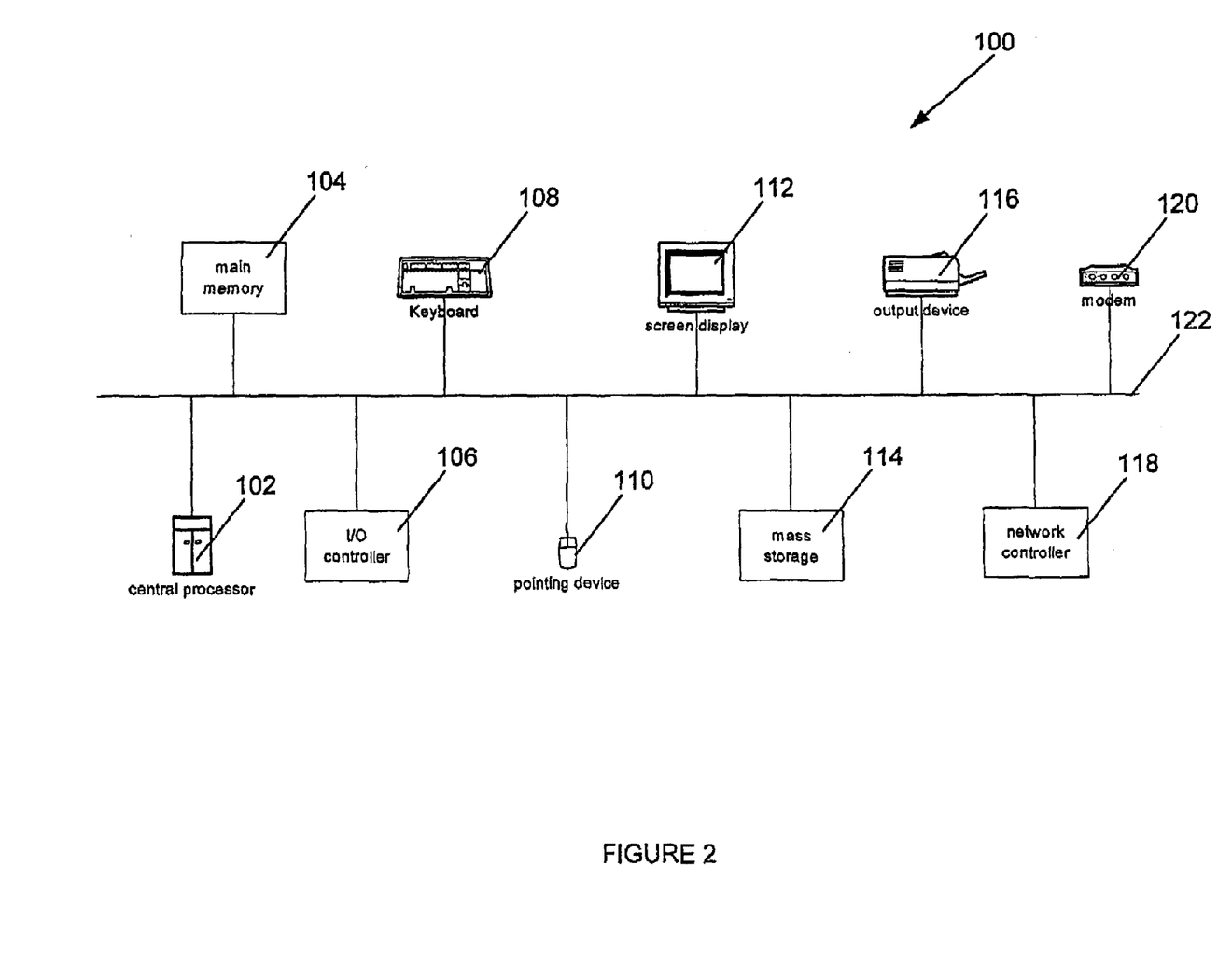
FIG. 2 shows the preferred system architecture of hardware on which the present invention may be implemented.

FIG. 2 shows the preferred system architecture of a client 20 or workstation 12. The computer system 100 typically comprises a central processor 102, a main memory 104 for example RAM and an input/output controller 106. The computer system 100 also comprises peripherals such as a keyboard 108, a pointing device 110, for example a mouse, touch pad or track ball, a display or screen device 112, a mass storage memory 114 for example a hard disk, floppy disk or optical disc, and an output device 116 for example a printer. The computer system 100 could also include a network interface card or controller 118 and/or a modem 120. As an alternative to a modem 120, it is envisaged that the computer system 100 could include wireless application protocol (WAP) apparatus. The individual components of the system 100 could communicate through a system bus 122.

It is envisaged that the invention have a wide area of application and the nature and format of the data stored in the data repository 40 and the metadata store 60 will be different for each application. The invention could be applied to data compiled from interactions between or among any organization. In each case, the workstation 12 is configured to receive a user query from a client 20, to process the query and to display a contoured representation of data on the screen display of a client workstation 20.

In one example, a merchant may operate a casino or similar gaming venue. The casino floor of the merchant could include a series of individual gaming machines, many of the gaming machines grouped into machine banks. During the course of the merchant's business, customers place funds in individual machines and the amount of funds placed in each machine is recorded and stored in a database.

A typical database could include a relational database which could be a single table for example RetailStoreData having a series of fields, for example bank, machine, turnover and value_cc. The machine and bank fields could store an individual machine identifier and a bank identifier of the bank in which that machine is positioned respectively. The turnover field could be used to store data on the revenue generated by an individual machine during a predetermined time interval, for example 1 minute, 10 minutes, 30 minutes and 60 minutes. The hour field could store data on the particular hour in which a turnover value is measured and the value_cc field could indicate the denomination of each machine, for example 5 cent, 10 cent, 50 cent, 1 dollar or 2 dollars.

Queries which seek to obtain information from a relational database such as that described above are usually defined by ANSI standard structured query language (SQL) statements. These statements define in computer recognizable terms the tables from which the data is to be extracted, the columns of interest, the conditions rows must satisfy, what columns are to be included, how the select columns are to be grouped, and the order of the columns.

A typical standard SQL statement could read as follows:
Select hour, bank, machine, sum (turnover) as sum_turnover
   from RetailStoreData
   where value_cc>10
   group by hour, machine
   order by hour;

The first two lines of this query specify that the data be retrieved from RetailStoreData. Specifically, the data requested is from the fields or columns referred to as hour, bank and machine. Line 1 of the query also specifies the aggregate function sum which requests the total of all rows satisfying the further conditions of the query of the given column turnover and creates a new variable sum_turnover to store this total.

The third line in the query introduces conditional selection and specifies that only certain rows of the RetailStoreData table are to be displayed, namely those rows in which the denomination of a machine, referred to as value_cc exceeds the value 10.

The fourth line of the query specifies that the individual turnover values of each machine are to be grouped firstly by hour and then by machine. The fifth line of the query specifies that the data is to be ordered by hour to ensure a correct temporal sequence.

The above query is normally passed to a query interpreter which parses the database query expression to identify the text strings of the select, from, where, group and order clauses described above. The query interpreter then executes the query to retrieve data from a relational database returning the results of a particular query as a series of rows and columns.

Our patent specification WO 00/77682 to Compudigm International Limited entitled "Data visualization system and method" is incorporated by reference and describes a system and method for optionally presenting the results of a query such as that described above in an easily interpreted and intuitive manner by displaying a contoured representation of data superimposed on a graphical spatial representation, for example the premises of a merchant.

The contoured representation and the graphical representation of the merchant have traditionally been hardcoded and difficult for a user, particularly a novice user, to alter or customize. The invention provides a non-standard SQL extension which enables the parameters of a contoured representation to be specified in the same database query expression in which the data is retrieved from the database.

A typical extended database query expression generated by a user on client 20 could read as follows:

```
Select hour, bank, machine, sum (turnover) as sum_turnover
from RetailStoreData
where value_cc> 10
group by hour, machine
order by hour
display contour map
    contour by sum_turnover
    label bank with sum_turnover [denomination]
    background CrownCasino
    title = "hourly turnover"
```

The first five lines of this query are the same as the standard query described above. Line 6 introduces a display clause which introduces a plurality of display parameters specifying that a contoured representation is to be generated of the data retrieved from the database with the preceding clauses in the database query expression. The display clause is preferably positioned after the standard order clause and is followed by a series of display parameters in the form of sub-clauses as will be described below.

Our patent specification WO 00/79438 to Compudigm International Limited entitled "Spatial data management system and method" is incorporated by reference. It describes the use of a data repository which specifically includes a spatial database.

Figure 3:
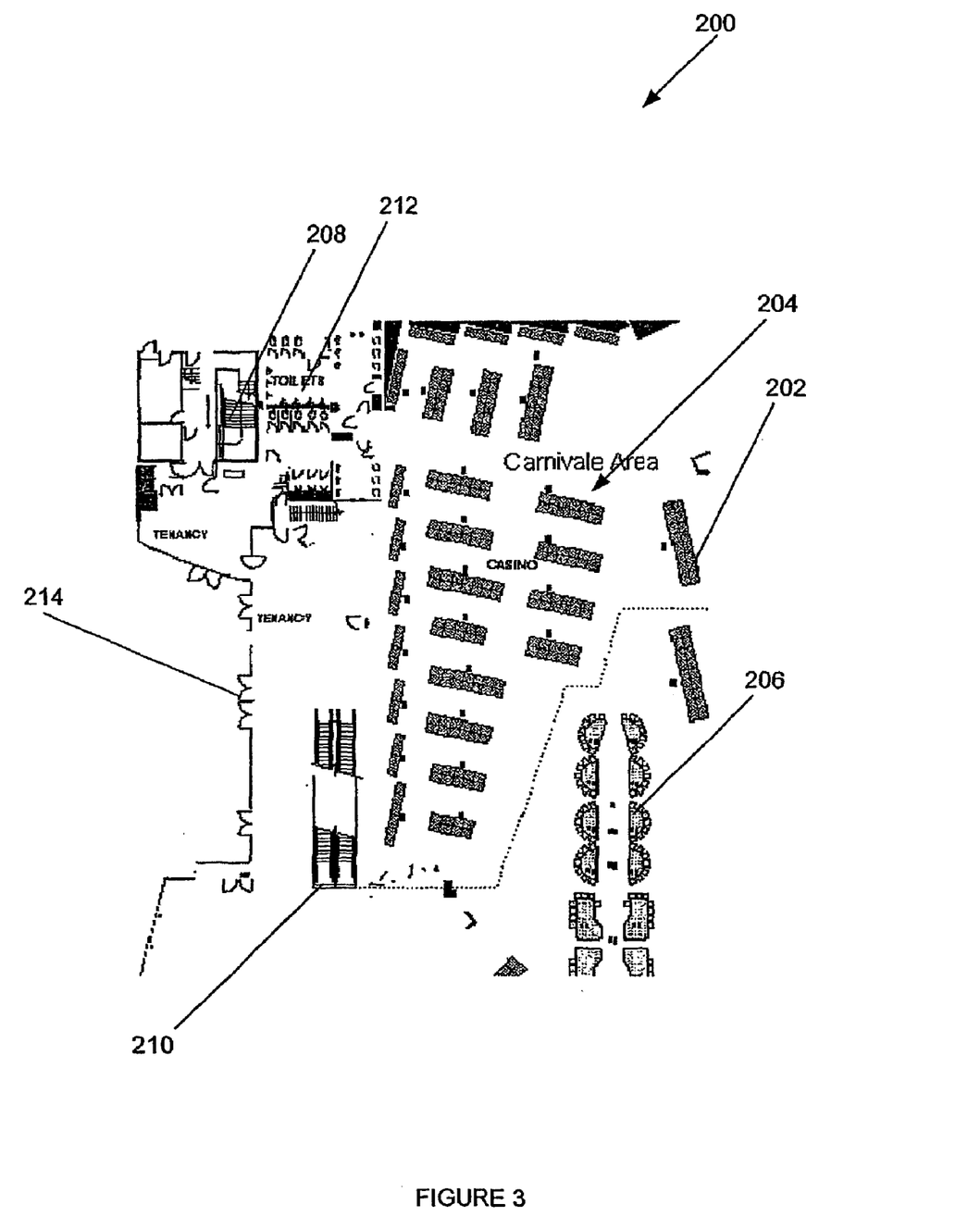
FIG. 3 is a spatial representation generated and displayed in accordance with the invention.

FIG. 3 illustrates one example of a spatial representation 200 generated by the system where the merchant operates a casino or similar gaming venue. It is envisaged that the invention display the premises of a merchant by displaying individual objects on a merchant premises. The representation includes spatial information relating to one or more objects, for example gaming machines indicated at 202 grouped into a series of machine banks, one of which is indicated at 204. The representation could also include gaming tables indicated at 206 and other objects, for example stairwells 208, escalators 210, toilet facilities 212, and doorways 214.

In the present invention, such a spatial representation is preferably stored in the metadata store 60 and indexed by keyword. For example, the representation of FIG. 3 could be indexed by the keyword CrownCasino and so the sub-clause background in the above example specifies that the collection of metadata layers of building plans and spatial layout shown in FIG. 3 be retrieved from the metadata store 60 using the keyword CrownCasino and displayed on a user workstation 20.

It will be appreciated that a plurality of spatial representations could be stored in the metadata store 60 and indexed by keyword to enable a user to specify a particular representation to be retrieved using the background sub-clause.

The sub-clause contour specifies the key performance indicator or KPI presented to a user. This KPI could include turnover as is the case with the query described above. The KPI could also include revenue, gross profit, net profit and any other value of interest to a user.

Figure 4:
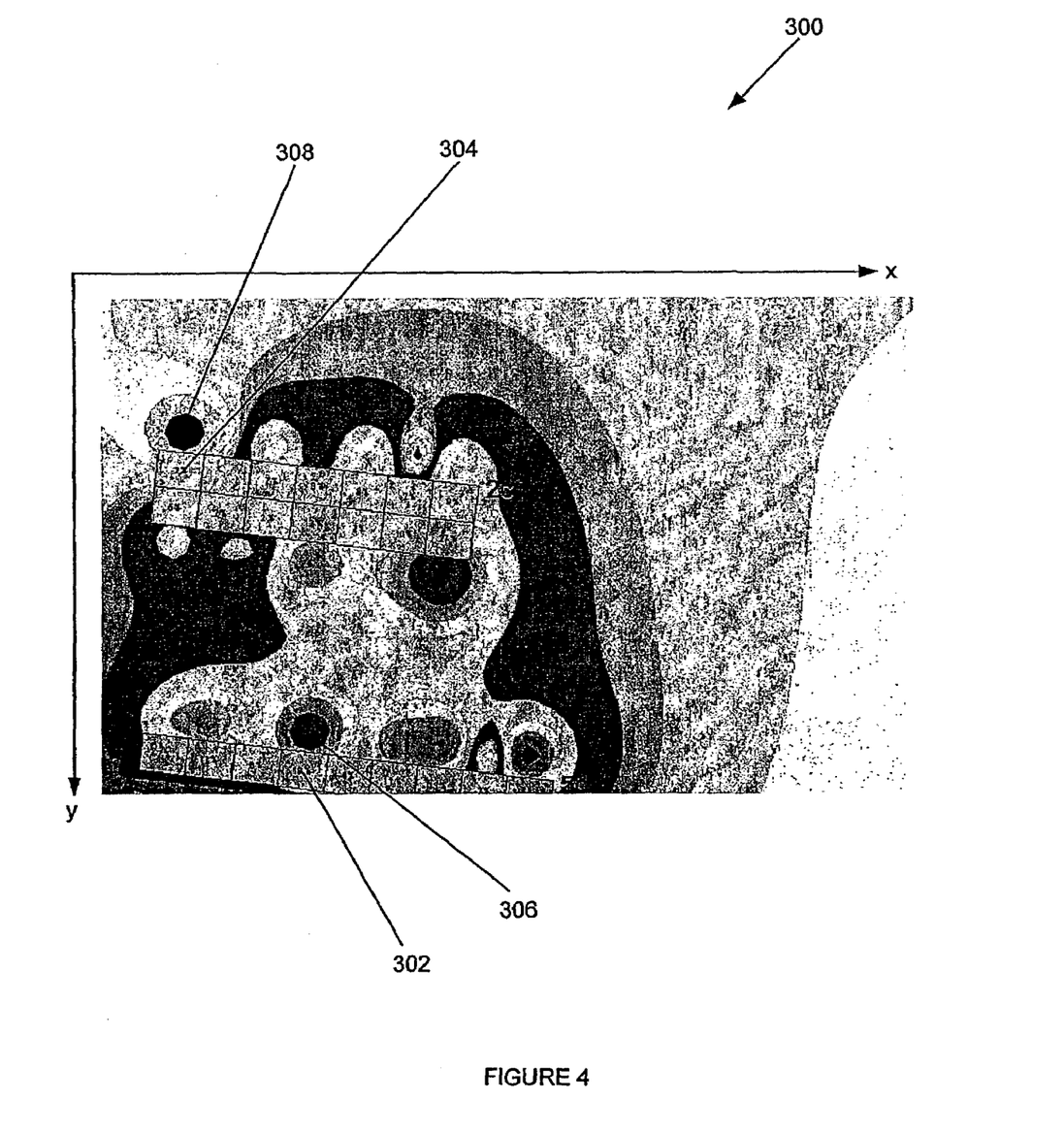
FIG. 4 is a contoured representation generated in accordance with the invention.

FIG. 4 illustrates at 300 one example of a contoured representation generated by the system where the merchant operates a casino or similar gaming venue. A background representation of the merchant is specified and the sum turnover is overlaid on the background. The representation 300 includes individual gaming machines and machine banks. Two individual gaming machines are indicated at 302 and 304 respectively. The turnover for each machine is preferably graphically represented adjacent to or near to the representation of the individual machine. There are a finite number of machines in the casino, and the individual turnover of each machine represents a finite set of data values. These data values are graphically illustrated as data points in the representation 300. For example, the turnover or data value for machine 302 is graphically illustrated as data point 306 and the turnover or data value for machine 304 is graphically illustrated as data point 308.

The preferred representation 300 is color-coded and the value of turnover of each machine is illustrated by representing the corresponding data points in the appropriate color to represent the correct value of turnover of each machine.

The areas of the representation 300 around each data point are shown as contours. The nature of the contours for each data point are preferably represented to gradually drop off or fall away from each data point. Each data point could be represented by x and y co-ordinates indicating the relative position of each data point in the representation. Each data point could also have a z value representing the height or magnitude of the data point. This z value could indicate, for example, the turnover or data value at a particular data point. Each data value is therefore centered on a data point.

The database query could also specify text to be overlaid on the spatial representation. For example, different machine banks could be labeled with the sum turnover for that bank and the denomination of each machine in the bank. It is envisaged that the database query could include a sub-clause label xx with yy, zz where xx refers to an object in the representation, for example a gaming machine or machine bank, and yy and zz indicate text values to be overlaid on object xx.

The database query expression could include further sub-clauses for example a title for the representation, a zoom level, a color shade for the representation, a unit sub-clause which could specify miles, kilometers, etc, and center (x, y) specifying the center of the representation. The query language could also include a boundary clause having the form bounds (x-min, y-min, x-max, y-max).

In a further preferred form of the invention, the display component 82 could be configured to display further representations of the set of data retrieved from the data repository 40. The data could be presented, for example, as a line graph, histogram or pie chart.

---

A typical query to display a line graph could read as follows:
    select hour, sum (turnover) as sum_turnover
    from RetailStoreData
    group by hour
    display line graph
        xaxis hour
        yaxis sum_turnover
        title "Store Hourly Turnover"
A typical query for displaying a histogram could read as follows:
    select hour, sum (turnover) as sum_turnover,
    sum (profit) as sum_profit
    from RetailStoreData
    group by hour
    display histogram
        xaxis hour
        yaxis sum_turnover, sum_profit
        title "Store Hourly Turnover"
A query for displaying a pie chart could read as follows:
    select hour, sum (turnover) as sum_turnover
    from RetailStoreData
    group by category
    display pie chart
        label sector sum_turnover

---

In this way, the display component 82 is configured to display a representation based at least partly on the display parameters specified in the database query.

Figure 5:
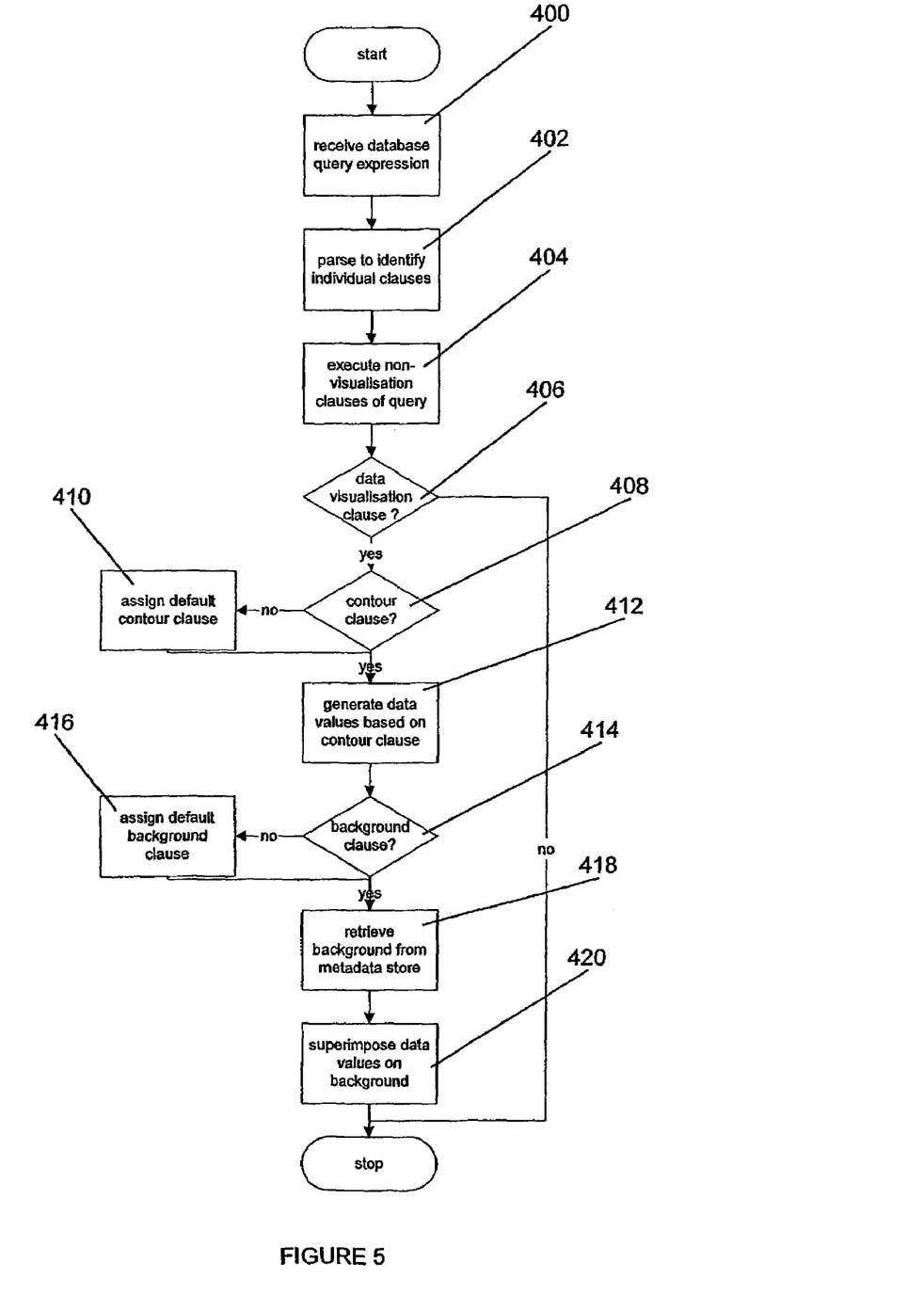
FIG. 5 is a flowchart of a preferred form of the invention.

FIG. 5 illustrates a preferred method of operation of the invention. As shown at 400, the invention 12 receives a database query expression from a user workstation 20. As shown at 402, the database query expression is parsed to identify individual clauses within the expression, for example the select, from, where, group and order clauses. As described above, the query expression could also include a display clause specifying a data visualization to be displayed to a user.

As indicated at 404, the standard non-visualization clauses of the query are executed to retrieve data from the database, for example interaction data from the interaction database.

As indicated at 406, if a data visualization display clause is present in the database query expression, the display clause is checked to see whether a contour sub-clause is present in the display clause. In some circumstances where a contour sub-clause is not present in the display clause, the invention could be arranged to assign a default contour value or clause as indicated at 410 in which the representation is contoured on revenue for example.

As shown at 412, the specified or default contour clause is then used to generate data values to present to a user. For example, should a user specify a contour variable of sum_turnover, then the data generated at step 412 would be the set of data values representing sum_turnover for one or more gaming machines or machine banks.

As indicated at 414, the database query expression is examined to locate a background clause. As described above, the background clause specifies a graphical spatial representation to present to a user. As shown at 416, if there is no background clause present, the invention could assign a default background clause.

As indicated at step 418, the specified or default background clause is used to retrieve a particular background or representation from the metadata store 60 and this representation is presented to a user.

At step 420, the data values generated from step 412 are superimposed on the background retrieved in step 418 to present a contoured representation to a user.

It is envisaged that the contoured representation could comprise an individual display or could alternatively comprise animated sequences of representations comprising two or more "still" representations at various time intervals.

It is envisaged that the system have a wide area of application. Typically, a merchant will operate in a commercial premises or store from which a customer purchases goods or services. The merchant may, for example, operate a petrol station in one or more geographic locations. The merchant may alternatively operate a wagering or betting service, or operate a casino or other gaming facility in which a number of gaming machines and stations are positioned in one or more rooms at a common venue. The merchant may also operate a warehouse facility, manufacturing facility, carparking premises, telecommunications network, website or call center. The merchant may also offer a range of financial or insurance services.

The merchant does not necessarily need to operate from a commercial premises or store. For example, the merchant may operate from strategically-placed machines, for example vending machines or amusement machines. The merchant may also operate a mail order catalogue service, direct market goods or services, or operate from a website or other electronic mediums. It will be appreciated that the nature of business of the merchant includes a wide range of activities.

The present invention enables a user to generate contoured representations easily, presenting data in an easily interpreted and intuitive manner. The foregoing describes the invention including preferred forms thereof. Alterations and modifications as will be obvious to those skilled in the art are intended to be incorporated within the scope hereof, as defined by the accompanying claims.

The invention claimed is:

1. A data visualization system executed on a storage device, comprising:
    a finite set of discrete values maintained in computer memory;
    a retrieval component configured to receive a database query expression and to retrieve a set of values from computer memory using the database query expression;
    a display component configured to display a graphical representation of each of the set of the retrieved data values centered on respective data points based at least partly on display parameters included in the database query expression; and
    a contour generator configured to generate and display one or more contour lines at least partly around each data point or group of data points, each contour line representing data values that are less than the data value(s) of the data point(s) around which the contour line is displayed.

2. A data visualization system as claimed in claim 1 wherein the display component is configured to optionally display a line graph representing the set of retrieved data, the line graph defined at least partly by the display parameters.

3. A data visualization system as claimed in claim 1 wherein the display component is configured to optionally display a histogram representing the set of retrieved data defined at least partly by the display parameters.

4. A data visualization system as claimed in claim 1 wherein the display component is configured to optionally display a pie chart representing the set of retrieved data defined at least partly by the display parameters.

5. A method of data visualization executed on a storage device comprising the steps of:
   maintaining in computer memory a finite set of data values;
   receiving a database query expression;
   retrieving a set of data values from computer memory using the database query expression;
   displaying a graphical representation of each of the set of the retrieved data values centered on respective data points based at least partly on display parameters included in the database query expression; and
   generating and displaying one or more contour lines at least partly around each data point or group of data points, each contour line representing data values that are less than the data value(s) of the data point(s) around which the contour line is displayed.

6. A method of data visualization as claimed in claim 5 further comprising the step of displaying a line graph representing the set of retrieved data, the line graph defined at least by the display parameters.

7. A data visualization system as claimed in claim 5 further comprising the step of displaying a histogram representing the set of retrieved data defined at least partly by the display parameters.

8. A method of data visualization as claimed in claim 5 further comprising the step of displaying a pie chart representing the set of retrieved data defined at least partly by the display parameters.

9. A data visualization computer program embodied on a computer readable storage device, comprising:
   a finite set of discrete data values maintained in computer memory;
   a retrieval component configured to receive a database query expression and to retrieve a set of data values from computer memory using the database query expression;
   a display component configured to display a graphical representation of each of the set of the retrieved data values centered on respective data points based at least partly on display parameters included in the database query expression; and
   a contour generator configured to generate and display one or more contour lines at least partly around each data point or group of data points, each contour line representing data values that are less than the data value(s) of the data point(s) around which the contour line is displayed.

10. A device as claimed in claim 9 wherein the display component is configured to optionally display a line graph representing the set of retrieved data, the line graph defined at least partly by the display parameters.

11. A device as claimed in claim 9 wherein the display component is configured to optionally display a histogram representing the set of retrieved data defined at least partly by the display parameters.

12. A device as claimed in claim 9 wherein the display component is configured to optionally display a pie chart representing the set of retrieved data defined at least partly by the display parameters.

13. A method of executing a database query expression on a storage device, the expression having a display clause and one or more standard clauses, the method comprising the steps of:
   identifying the display clause within the query expression;
   identifying a contour sub-clause within the display clause, the contour clause specifying a key performance indicator;
   retrieving a set of data values from computer memory using one or more of the standard clauses within the query expression;
   displaying a graphical representation of each of the set of retrieved data values centered on respective data points;
   generating and displaying one or more contour lines at least partly around each data point or group of data points, each contour line representing values of the key performance indicator specified in the contour sub-clause less than the data value of the data point around which the contour line is displayed.

14. The method of claim 13 further comprising the steps of:
   identifying a background sub-clause within the display clause, the background sub-clause specifying a spatial representation;
   displaying the spatial representation specified in the background sub-clause; and
   displaying the contour lines overlaid on the spatial representation.

15. The method of claim 14 further comprising the steps of:
   identifying a label sub-clause within the display clause, the label sub-clause specifying text to be overlaid on the spatial representation; and
   displaying the text overlaid on the spatial representation.

16. The method of claim 14 further comprising the steps of:
   identifying a title sub-clause within the display clause, the title sub-clause specifying a title to be overlaid on the spatial representation; and
   displaying the title overlaid on the spatial representation.

17. The method of claim 14 further comprising the steps of:
   identifying a zoom sub-clause within the display clause, the zoom sub-clause specifying a scale for the spatial representation; and
   displaying the spatial representation at a scale specified in the zoom sub-clause.

18. The method of claim 14 further comprising the steps of:
   identifying a color sub-clause within the display clause, the color sub-clause specifying one or more colors for the spatial representation; and
   displaying the spatial representation in one or more of the colors specified in the color sub-clause.

19. A computer program stored on tangible storage media comprising executable instructions executed on a storage device for performing a method of executing a database query expression, the expression having a display clause and one or more standard clauses, the method comprising the steps of:

identifying the display clause within the query expression;

identifying a contour sub-clause within the display clause, the contour clause specifying a key performance indicator;

retrieving a set of data values from computer memory using one or more of the standard clauses within the query expression;

displaying a graphical representation of each of the set of retrieved data values centered on respective data points; and generating and displaying one or more contour lines at least partly around each data point or group of data points, each contour line representing values of the key performance indicator specified in the contour sub-clause less than the data value of the data point around which the contour line is displayed.

20. The device of claim 19 where the method further comprises the steps of:

identifying a background sub-clause within the display clause, the background sub-clause specifying a spatial representation;

displaying the spatial representation specified in the background sub-clause; and displaying the contour lines overlaid on the spatial representation.

21. The device of claim 20 where the method further comprises the steps of:

identifying a label sub-clause within the display clause, the label sub-clause specifying text to be overlaid on the spatial representation; and displaying the text overlaid on the spatial representation.

22. The device of claim 20 where the method further comprises the steps of:

identifying a title sub-clause within the display clause, the title sub-clause specifying a title to be overlaid on the spatial representation; and displaying the title overlaid on the spatial representation.

23. The device of claim 20 wherein the method further comprises the steps of:

identifying a zoom sub-clause within the display clause, the zoom sub-clause specifying a scale for the spatial representation; and displaying the spatial representation at a scale specified in the zoom sub-clause.

24. The device of claim 20 wherein the method further comprises the steps of:

identifying a color sub-clause within the display clause, the color sub-clause specifying one or more colors for the spatial representation; and displaying the spatial representation in one or more of the colors specified in the color sub-clause.

* * * * *